April 7, 1931.

M. SCHWARTZ

INTERCEPTING TRUNK SYSTEM

Re. 18,038

Original Filed Feb. 9, 1924 2 Sheets-Sheet 1

Inventor
Michael Schwartz
Chas. M. Candy. Atty.

April 7, 1931.

M. SCHWARTZ

INTERCEPTING TRUNK SYSTEM

Re. 18,038

Original Filed Feb. 9, 1924

2 Sheets-Sheet 2

Inventor
Michael Schwartz
Chas. M. Candy Atty.

Reissued Apr. 7, 1931

Re. 18,038

UNITED STATES PATENT OFFICE

MICHAEL SCHWARTZ, OF CHICAGO, ILLINOIS, ASSIGNOR, BY MESNE ASSIGNMENTS, TO AUTOMATIC ELECTRIC INC., OF CHICAGO, ILLINOIS, A CORPORATION OF DELAWARE

INTERCEPTING TRUNK SYSTEM

Original application filed February 9, 1924, Serial No. 691,679. Renewed August 26, 1927. Original No. 1,665,479, dated April 10, 1928. Application for reissue filed April 7, 1930. Serial No. 442,432.

The present invention relates in general to telephone systems, but is particularly concerned with the provision of new and improved trunking arrangements for handling calls to lines out of order, or to lines on which the service has been discontinued, etc., trunks for handling these services being commonly known as intercepting trunks, and the broad object of the invention is to provide an intercepting trunking system which is more flexible, economical, and convenient in practice than any such system heretofore known to applicant.

A particular object is to provide an intercepting trunking system in which, by simply removing battery potential from the cut-off relay of a line switch of a line in trouble, or an unassigned line, the calls extended thereto are automatically trunked to an intercepting operator's position.

Another object is to provide means whereby an intercepting operator, upon answering a call extended to her position, is automatically informed that the number called represents a called working line which is in trouble or is a dead number, as the case may be.

Other minor features of the invention not specifically pointed out will be brought out in the detailed description which follows.

Figure 1:
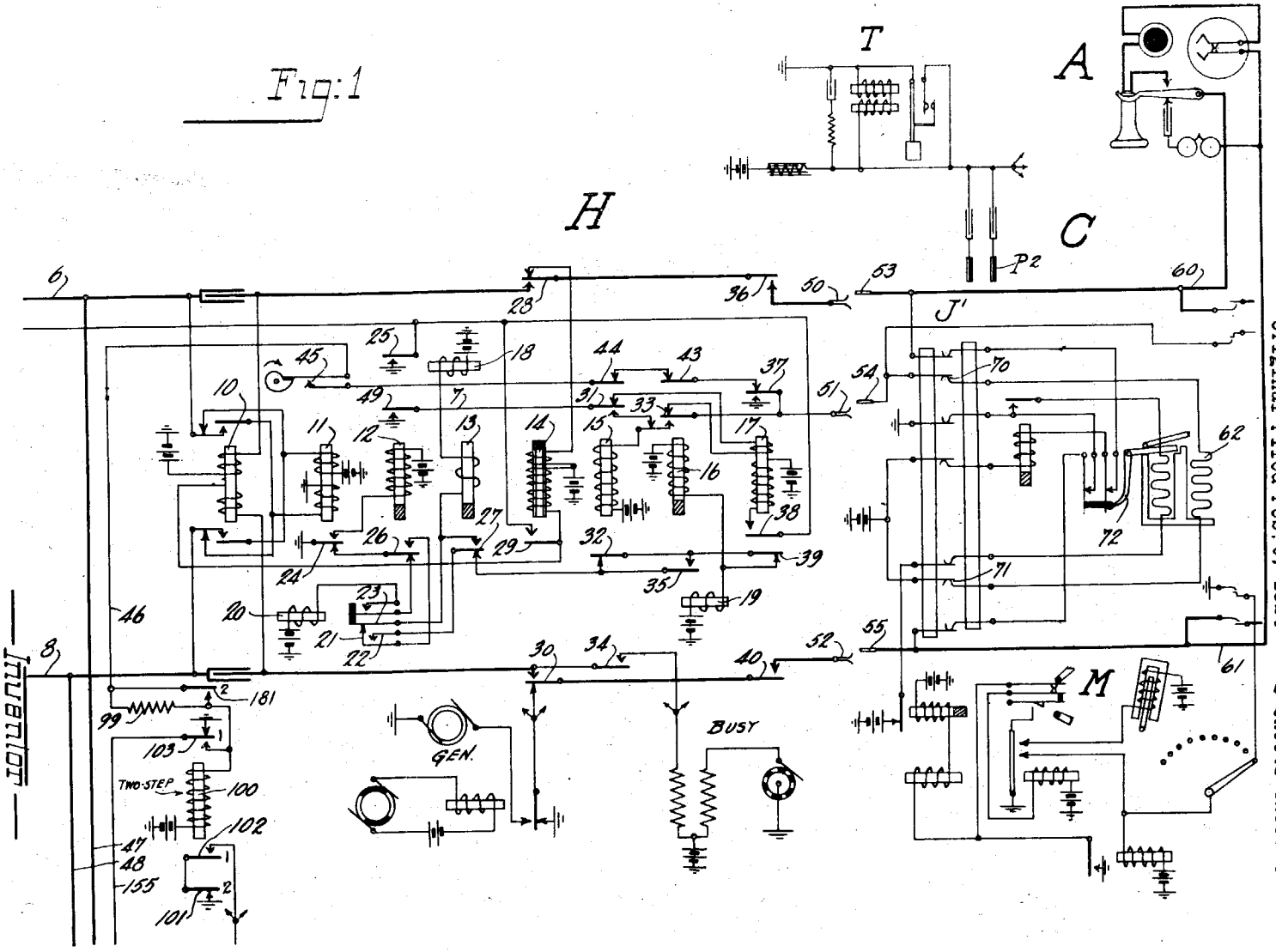
Figure 2:
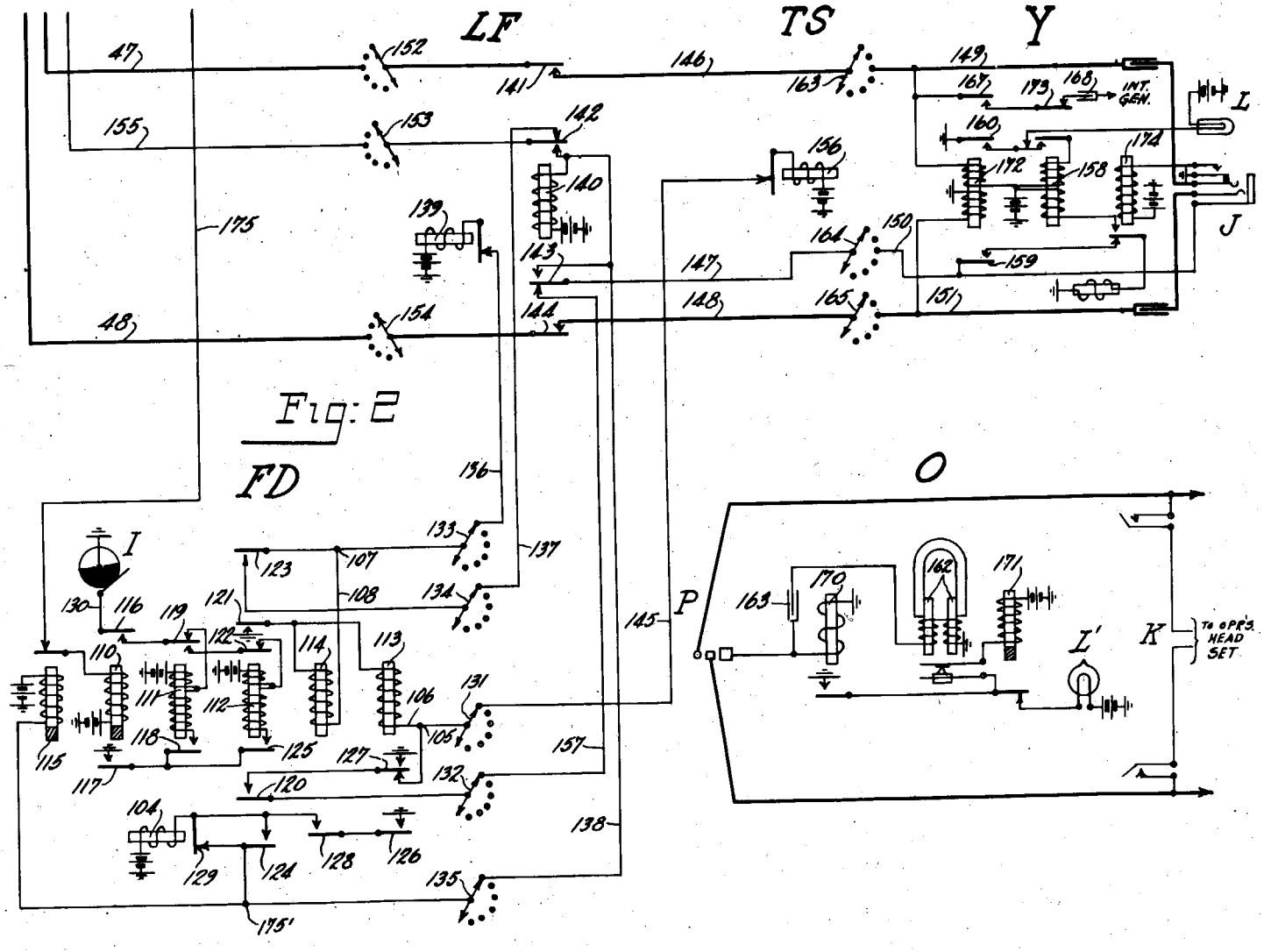

Referring now to the drawings comprising Figs. 1 and 2, these figures, when arranged with Fig. 1 immediately above Fig. 2, show sufficient of the circuits and apparatus of an automatic telephone system to enable the invention to be clearly understood.

Referring to the figures in detail, Fig. 1 shows a connector H, line switch C, substation A, special high frequency generating equipment T, and a start relay 100. The connector H is of the well known Strowger type and is wired in accordance with the usual two-wire practice. Minor circuits additions have, however, been made in accordance with the present invention. These added circuits will be fully described hereinafter. The line switch C is of the well known Keith or plunger type. The master switch M is of the usual solenoid type used to maintain the plungers of idle line switches before an idle trunk. The substation A comprises the usual apparatus used in substations of automatic telephone systems. The special high frequency generating equipment T consists of an ordinary high frequency buzzer operating preferably at about 400 cycles per second. This equipment is common to any number of lines and its purpose will be clearly brought out hereinafter. The start relay 100 is individual to the connector H, and is for a purpose which will be subsequently made clear.

Fig. 2 shows a line finder LF, trunk hunting switch TS, a finder distributer FD, a special "A" or intercepting operator's position Y, and also an operator's cord circuit for answering calls extended to her position. In the cord circuit is included a very sensitive A. C. relay, which may be of the type disclosed in Patent No. 1,221,299, issued to C. J. Erickson, April 3, 1917. The line finder, trunk hunting, and finder distributer switches are mechanically the same as line switches of the well known rotary type having their wipers always in engagement with a set of bank contacts.

Having given a description of the miscellaneous equipment shown in Figs. 1 and 2, it is deemed advisable, before going into the detailed description of the invention, to briefly describe the trunking arrangement of the intercepting system. It is assumed, in the present case that the connectors H are divided into groups of fifty connectors each. There are provided four or five fifty point line finders LF for each group of fifty connectors and, of course, since the trunk hunting switches are individual to their associated line finders, a like number of these switches are necessary. The trunk hunting switches may be of the twenty-five or fifty point type dependent, of course, upon the traffic conditions. For each group of connectors there is provided one finder distributer FD. This finder distributer has its wipers normally associated with an idle link circuit of its associated group and permits the trunk hunting operation and line finding operation to take place automatically when the switching through relay of a connector, which has been seized, remains deenergized for a predetermined time after the connector has come to rest on the contacts of a called line.

In order to describe the invention, it will now be assumed that a calling subscriber desires to extend a connection to the substation A, whereupon such subscriber, upon removing his receiver and operating his calling device, causes the various switches of a switch train to extend a connection to the connector H which, it is assumed, is idle, causing the energization of line relay 11 which in turn completes a circuit for the slow release relay 12. Upon energizing, relay 12 prepares the connector for operation in its vertical movement in the usual way and at armature 25 connects ground to the release trunk conductor. A holding circuit is thus established which maintains all the previously operated switches in operated position in the usual manner.

When the next series of impulses is transmitted over the control circuit by the calling subscriber the line relay 11 of the connector H is momentarily deenergized a plurality of times and at each deenergization transmits an impulse of current to the vertical magnet 18 over a path which extends from ground by way of armature 24 and its resting contact, armature 26 and its working contact, off normal springs 21 and 23, winding of the slow acting series relay 13, and the winding of the vertical magnet 18 to battery. By the operation of the vertical magnet the wipers 50—52, inclusive, are raised step by step until they stand opposite the desired level of bank contacts. Relay 13 is energized in series with the vertical magnet 18 and being slow acting holds up continuously during the vertical operation of the switch. By the operation of this relay, the vertical magnet circuit is preserved intact, notwithstanding the shifting of the off normal springs, which occurs at the first vertical step of the switch. At the end of the vertical movement, relay 13 deenergizes and transfers the operating circuit to the rotary magnet 19.

The calling subscriber now transmits the final series of impulses of the called telephone number. Responsive to these interruptions the line relay 11 is deenergized a corresponding number of times and now sends impulses to the rotary magnet 19 over the following circuit: from ground by way of armature 24 and its resting contact, armature 26 and its working contact, off normal springs 21 and 22, armature 27 and its resting contact, resting contact of armature 32 and the said armature, armature 39 and its resting contact, and the winding of the rotary magnet 19 to battery. By the operation of the rotary magnet, the wipers 50—52, inclusive, are rotated step by step and are finally brought to rest in engagement with the particular set of bank contacts in which the line of substation A is terminated, these contacts being indicated in the drawings by reference characters 53, 54 and 55. The slow acting relay 16 is energized in parallel with the rotary magnet and remains continuously energized during the rotary movement. In operated position, relay 16 connects the test wiper 51 to the winding of the test relay 15 by means of its armature 33 and at armature 35 closes an alternative point in the circuit of the rotary magnet, to guard against the possibility of having this circuit opened by the operation of the test relay while the test wiper 51 is passing over grounded test contacts.

The final series of impulses has now been received, and the connector wipers have been placed in connection with the terminals of the called line. If the line is busy there will be a ground potential on the test contact 54 and the test relay 15 will be energized. When this relay operates it prepares a locking circuit for itself at its armature 31, which is completed when the slow acting relay 16 falls back an instant later, opens the rotary magnet circuit at armature 32, and at armature 34 connects a lead from the busy signaling machine to the lower side of the line. On perceiving the signal, the subscriber will replace his receiver, thereby releasing the connector H and all previously operated switches.

Assuming now that the called line is idle when connection therewith is attempted, under these circumstances there will be no ground on the test contact 54, and the test relay 15 will not be energized. Then when the slow acting relay 16 falls back a circuit is completed for the switching relay 17 which may be traced from the grounded conductor 7, by way of armature 31 and its resting contact, the upper winding of the switching relay 17, resting contact of armature 33 and the said armature, test wiper 51, test contact 54, contacts 70 of the jack J′, winding of the cut-off or switching relay 62 of the line switch C, contacts 71 of jack J′, to battery. Relays 17 and 62 are energized in series over this circuit, and the latter relay operates armature 72 to clear the line conductors 60 and 61 of their normal battery and ground connections in the line switch C.

At the connector H, when the switching relay 17 pulls up, it establishes a locking circuit for itself at armature 38, grounds the test wiper 51 at armature 37, opens the rotary magnet circuit at armature 39, and at armatures 36 and 40 connects up the two line wipers 50 and 52. By the latter operation a signaling circuit is established whereby ringing current from the generator GEN is intermittently projected out over the called line to operate the bridged ringer at substation A to notify the called subscriber that he is wanted. The return path for the ringing current includes the upper winding of the ring cut off relay 14, and when the called subscriber answers this relay is operated. Upon energizing, relay 14 establishes a locking circuit for itself at its armature 29, breaks the ringing circuit at armatures 28 and 30, and at the working contacts of these same armatures finally completes the talking connection.

Current is now supplied to the transmitter at substation A through the windings of the double wound back bridge relay 10 which is accordingly energized. This relay is a reversing relay and has the well known function of reversing the incoming trunk conductors 6 and 8 as regards their connections with the windings of the relay 11. This reversing operation is a standard operation and is for the purpose of operating subscribers' paystation or metering apparatus, and in some cases is used for supervisory purposes. The subscribers may now converse as desired.

When the subscribers are through talking they will replace their receivers, causing the connector H and all previously operated switches to be released in the usual and well known manner.

There is nothing particularly new in the operations above described. It is thought, however, that the above description will be a material aid in making clear the various features of the invention.

It will now be assumed that the subscriber at station A has had his service discontinued, or that the telephone at station A has been taken out. Now in order to trunk calls which may be extended to the line switch C to a special "A" or intercepting operator's position, it is only necessary that battery potential be removed from the test contact 54 of the line switch C. This is accomplished in a simple manner by merely placing a thin piece of insulating material between springs 70 of the jack J'. When the connector H seizes the line switch C under these conditions, the test wiper 51 fails to find battery, and when the slow relay 16 deenergizes, relay 17 fails to pull up and a circuit is completed for start relay 100. This circuit may be traced from grounded working contact of armature 49 and the said armature, armature 31 and its resting contact, upper winding of relay 17, resting contact of armature 33 and the said armature, armature 37 and its resting contact, armature 43 and its resting contact, resting contact of armature 44 and the said armature, rotary off normal springs 45, conductor 46, resistance 99, and the winding of relay 100 to battery. Due to the high resistance of relay 100, switching relay 17 does not energize, and relay 100, due to the inclusion of resistance 99, only receives sufficient current to cause it to operate its armatures 102 and 103. The operation of armature 103 causes ground to be removed from conductor 155 terminating in a bank contact of the line finder LF, at the front contact of this same armature prepares a new circuit for relay 100 independent of the resistance 99, and at armature 102 completes a circuit for slow release relay 110 of the finder distributer. Relay 110, upon operating, at its armature 117 prepares locking circuits for relays 111 and 112, and at armature 116 connects interrupted ground to the windings of relay 111. Interrupter I is arranged to apply ground to conductor 130 for a period of one half second and then to remove ground from this conductor for a like period. As soon as ground is connected to conductor 130 relay 111, upon having a circuit completed through its upper winding, operates its armature 118, thereby short circuiting the lower winding of this relay. Armature 119 is so adjusted that it will not operate until the current flow is established through both windings of relay 111. As soon as ground is removed from conductor 130 a circuit is completed from the grounded working contact of armature 117 and the said armature, armature 118 and its working contact, and the windings of relay 111 in series to battery. Relay 111 now actuates armature 119 switching the connected conductor 130 from connection with the windings of relay 111 to the windings of relay 112. As soon as a one half second interval has elapsed relay 112 operates sufficiently to cause its armature 125 to engage its working contact, and at the termination of another half second interval the short circuit is removed from the lower winding of this relay permitting it to also operate its armatures 120—124, inclusive. The operation of armature 121 completes circuits for relays 113 and 114. The circuit for relay 113 may be traced from grounded working contact of armature 121 and the said armature, winding of relay 113, wiper 131 and its associated contact, conductor 145, interrupter springs of the motor magnet 156, and the winding of said magnet to battery. The circuit for relay 114 may be traced from the grounded working contact of armature 121 and the said armature, winding of relay 114, conductor 108, wiper 133 and its associated contact, conductor 136, interrupter springs of the motor magnet 139, and the winding of said magnet to battery. By the operation of armature 124 a circuit is prepared for the motor magnet 104 of the finder distributer FD independent of interrupter contacts 129, and by the operation of armatures 120 and 123 test wipers 164 and 153 are connected to junctions 105 and 107, respectively.

Assuming now that the trunk hunting switch TS has its wipers associated with a trunk line which is in use, the contact with which wiper 164 is in engagement will have ground potential thereon and a circuit will be completed for motor magnet 156 which may be traced as follows: grounded wiper 164, conductor 147, armature 143 and its resting contact, conductor 157, wiper 132, armature 120 and its working contact, armature 127 and its resting contact, junction 105, wiper 131 and its associated contact, conductor 145, interrupter springs of motor magnet 156, and the winding of said magnet to battery. Relay 113 is short circuited by ground at junction 105 and cannot operate. Magnet 156 operates and interrupts its own circuit, and upon deenergizing steps the wipers 163—165, inclusive, into engagement with the contacts of the next trunk line. If this trunk line is in use, the above described operation of magnet 156 will be repeated. As soon as the wiper 164 comes into engagement with the test contact associated with conductor 150 of the trunk line comprising conductors 149—151, inclusive, which it is assumed is idle, no ground potential will be present on conductor 150 and the switching relay 113 will no longer be short circuited and will therefore operate. Since the resistance of this relay is very high compared to that of motor magnet 156, the magnet is not operated at this time. Relay 113, upon operating, at its armature 127 grounds the test conductor 150 of the seized trunk, to make the same busy to other trunk selecting switches, and at its armature 126 prepares a point in the operating circuit of magnet 104, and relays 115 and 140.

Assuming now that the wipers 152—154, inclusive, of the line finder are not in engagement with contacts associated with connector trunk conductors 47, 48 and 155. Under these conditions ground will be present on the contact on which wiper 153 is positioned and, therefore, a circuit will be completed for motor magnet 139, this circuit being traceable from the grounded test wiper 153, armature 142 and its resting contact, conductor 137, wiper 134, working contact of armature 123 and the said armature, junction 107 (ground at this point short circuits relay 114 and prevents it from operating), wiper 133 and its associated contact, conductor 136, interrupter springs of the motor magnet 139 and the winding of said magnet to battery. The magnet 139 will, therefore, operate and as long as the test wiper 153 comes into engagement with idle connector trunks, will continue to operate in the same manner as explained in connection with the operation of magnet 156. As soon as the test wiper 153 comes into engagement with the bank contact with which the ungrounded conductor 155 is associated, magnet 139 will cease to operate and relay 114, having the short circuit removed from its winding, will now energize. Since both switching relays 113 and 114 are now operated multiple circuits are completed for motor magnet 104 and relays 115 and 140, respectively. The circuit for magnet 104 may be traced from grounded working contact of armature 126 and the said armature, armature 128 and its working contact, through the winding of motor magnet 104 to battery. The circuits of relays 115 and 140 extend by way of armature 128 and its working contact, working contact of armature 124, to junction 175′ where the circuit divides, one branch extending direct to the winding of relay 115 and to battery, while the other branch extends by way of wiper 135, conductor 138, and the winding of said relay 140 to battery. The result of the operation of magnet 104 and relay 115 will be described later. Relay 140, upon operating, at its armatures 141 and 144 and their working contacts extends the talking conductors of the calling line by way of conductors 146, 148, and conductors 149 and 151 to the intercepting operator's position Y, at armature 143 shifts conductor 147 from engagement with grounded conductor 157 into engagement with grounded conductor 138, and at armature 142 disconnects wiper 153 from engagement with conductor 137 and connects this wiper to grounded conductor 138. The line relay 11 of the connector H is bridged across conductors 6 and 8, which are now extended by way of conductors 47 and 48, conductors 146 and 148 to conductors 149 and 151 across which are bridged the windings of relay 172 at the intercepting operator's position. Relay 172 operates in multiple with line relay 11 and at its armature 167 connects interrupted generator to the conductor 149 by way of armature 173 and its resting contact and low capacity condenser 168. Condenser 168 allows just sufficient current to leak back over the calling line to give the calling subscriber the usual ring-back tone to inform him that the signaling operation is taking place. Relay 172 also, at armature 160, completes a circuit for the call signal lamp L, which glows to notify the intercepting operator that a call is awaiting her attention, and at armature 159 applies ground through a low resistance retard coil to conductor 150 to maintain the trunk busy to other trunk selecting switches independent of ground supplied by way of wiper 135, and to provide a holding circuit for relays 140 and 100 after the finder distributor has stepped ahead.

At the same time that the circuit for relay 172 was completed, a new circuit was completed for start relay 100 at armature 142 independent of resistance 99 in multiple with the winding of relay 142, permitting relay 100 to operate its armatures 101 and 181. The operation of armature 101 causes ground to be removed from the common start conductor, while armature 181 short circuits high resistance 99. The latter operation continues the holding circuit ground on conductor 150 back to the test wiper of the connector, thus shunting the upper winding of relay 17 so that if another connector should connect with the same line relay 17 would not pull in series with the busy test relay of the second connector.

It will be recalled that slow release relay 115 and motor magnet 104 were energized in multiple with switching relay 140. The result of the operation of relay 115 and magnet 104 will now be described. Relay 115 operates and opens the circuit of relay 110. Relay 110, upon deenergizing, at its armature 117 opens the locking circuits of relays 111 and 112. These relays, accordingly, deenergize. The deenergization of relay 111 in no way affects the operation of finder distributor FD. Relay 112, however, upon deenergizing, at its armature 121 breaks the circuits of switching relays 113 and 114 and these relays, accordingly, restore to normal. The deenergization of relays 113 and 114 causes ground to be removed from the common operating circuit of relays 115, 140 and motor magnet 104. Magnet 104 and relay 115, accordingly, deenergize. Relay 140, however, does not deenergize due to the previously described holding circuit completed for it by the operation of armature 159 of relay 172. Magnet 104, upon deenergizing, shifts its wipers 131—136, inclusive, into engagement with the next link circuit. If the next link circuit happens to be in use at this time its associated conductor 138 will have ground potential thereon and an operating circuit for magnet 104 will again be completed by way of wiper 135, interrupter contacts 129, and the winding of said magnet 104 to battery. Upon the complete energization of magnet 104 the interrupter springs 129 are opened, and this magnet, therefore, deenergizes to advance the wipers into engagement with the next link. It will be quite evident that this operation will be repeated until an idle link circuit is found. Since relay 115 is connected to wiper 135 this relay receives ground impulses in multiple with magnet 104 and, being slow to release, will remain operated during the operation of magnet 104 to maintain the relay 110 disconnected from the common start conductor until an idle finder link is found.

Assuming now that no other connector, of the group to which connector H belongs, has in the meantime been positioned on contacts of a line in trouble, etc., no other start relay, such as 100, will be operated, and since, as previously explained, armature 101 of relay 100 is now operated no ground is present on conductor 175 and relay 110, therefore, does not again operate. If, however, it be assumed that a connector has in the meantime been positioned on contacts of a line in trouble, etc., its associated relay 100 will be energized and therefore conductor 175 will have ground potential thereon and relay 110 will again operate to initiate the operation of the preselected finder link in the same manner as previously described.

The operations which take place at the intercepting operator's position will now be described. The intercepting operator, upon observing the lighted condition of lamp L inserts the plug P of her cord circuit in the jack J, thereby closing a circuit for relay 174. Relay 174, upon operating, removes ground from conductor 150 and completes a circuit for relay 158. Relay 158, upon operating, at its lower armature opens the circuit of lamp L, and locks itself up through its upper winding and the working contact of this same armature, and at its armature 173 disconnects interrupted generator tone from the upper line conductor. When the plug was inserted in jack J sleeve relay 170 in the cord O energized in series with relay 140. Relay 170 in operating completed a circuit for slow relay 171. This latter relay in operating prevented the lamp L′ from being lighted. Since the lamp L′ fails to glow the operator knows that the call has been extended to a dead number. The sleeve of the plug applies ground to the sleeve of the jack J via low resistance relay 170 in substitution of the ground formerly supplied by way of the operated armature 159 to maintain the trunk Y busy to other trunk selecting switches.

The operator may now operate key K and converse with the calling subscriber, giving such subscriber any information she may have available regarding the number of the desired called subscriber. When the conversation is completed the calling subscriber replaces his receiver, resulting in the release of the connector H and all previously operated switches. Since relay 172 is connected in multiple with relay 11, relay 172 also restores and in so doing opens the locking circuit of relay 158. During the restoring operation of connector H off normal springs 45 open the holding circuit, and as a result these relays restore to normal. Since ground is now removed from the conductor 138, the finder link, comprising switches LF and TS is again rendered selectable by the wiper 135 of the finder distributer FD.

The operator upon removing the plug from the associated jack causes relays 174 and 158 to deenergize. Ground being now removed from conductor 150 the trunk is again rendered selectable.

It will now be assumed that the line switch C is assigned to the line extending to substation A, and that this line is temporarily in trouble. Under these conditions, the attendant at the exchange will insert a plug $P^2$ of the common apparatus T between springs 70 of jack J′, thereby substituting a high frequency current to the upper one of the springs 70 for the battery formerly supplied via springs 71 and winding 62 of the line switch C. Upon a connection being attempted with the working line A in trouble, the operations previously described will again take place, but this time, since the high frequency apparatus T is associated with the line called, the operations which take place, when the operator answers, will be slightly different.

When the operator plugs into jack J, a circuit is completed for A. C. relay 162. This circuit may be traced from high frequency apparatus T, plug $P^2$, upper one of the springs 70, bank contact 54, wiper 51, armature 37 and its resting contact, armature 43 and its resting contact, resting contact of armature 44 and the said armature, rotary off normal contact 45, conductor 46, armature 181 and its working contact, working contact of armature 103 and the said armature, conductor 155, wiper 153, armature 142 and its working contact, working contact of armature 143 and the said armature, conductor 147, wiper 164, conductor 150, sleeve of jack J, sleeve side of plug P, condenser 163, and the winding of relay 162 to ground. Relay 162 therefore operates at the same time as does relay 170, thereby preventing the operation of relay 171. Lamp L′ is therefore lighted to immediately inform the operator of the character of the called line thereby enabling the operator to convey such information to the calling subscriber without delay.

After conversation has been completed, release is brought about in the same manner as previously described.

Before concluding, it is thought advisable to explain the reason for providing the equipment comprising interrupter I and two-step relays 111 and 112 for delaying the operation of the switches LF and TS. It will be noted that a connector, such as H, upon switching through, transmits a momentary ground impulse to its associated start relay 100 over a circuit extending from grounded conductor 7, armature 31 and its resting contact, upper winding of relay 17, resting contact of armature 33 and the said armature, armature 37 and its resting contact, over the previously traced circuit through the associated start relay. The possibility of a number of connectors, switching through in close sequence, resulting in the starting of a finder link is made impossible by the use of this delaying mechanism.

Attention is also called to the fact that since the holding circuit used for the transmission of the high frequency currents to the operator is nowhere connected direct to ground or battery, even before the operator plugs in to answer the call, it is possible for the operator to test for the presence of these signalling currents on the sleeve of the jack before plugging in, the same as when testing a line to see if it is busy. When this method of operation is followed the special equipment shown in the cord circuit O is of course not needed and a standard subscribers' operator's cord circuit may be used.

Having fully described the invention, what is considered new and is desired to have protected by Letters Patent will be pointed out in the appended claims.

What I claim is:

1. In a telephone system, a calling line, called lines, unassigned called lines, other called lines assigned but temporarily out of service, means including automatic switches for extending a connection to any of said called lines, means responsive when a connection is extended to either of the latter type of called lines for automatically trunking the call to an operator's switchboard, and means whereby an operator upon answering is immediately informed of the class of line called.

2. In a telephone system, a calling line, unassigned called lines, other called lines assigned but temporarily out of service, means including automatic switches for extending connections to said called lines, means responsive when a connection is extended to either of the above type of called lines for automatically trunking the call to an operator's switchboard, a visual signal at said switchboard, means operative when an operator answers a call for causing the operation of said signal if the line called is of the latter type, and means operative preventing the operation of said signal in case the called line is of the first type.

3. In a telephone system, a called line temporarily out of service, a connector switch adapted to be controlled over a calling line to connect with said called line, an operator's switchboard, a link circuit comprising a finder switch and a hunting switch, and a start relay associated with said connector operative when said line is called for causing said link circuit to connect the calling line with said switchboard.

4. In a telephone system, a connector switch, wipers for said switch adapted to be positioned on terminals of called lines, a switching relay in said connector operative when a line is called, means for preventing the operation of said relay should the line called be in trouble, and means operative should the switching relay fail to operate within a predetermined period for causing said connection to be extended to an operator's switchboard.

5. In a telephone system, a calling line, called lines of different classes, an automatic switch having access to said lines, subscriber controlled means for causing said automatic switch to extend connections to said lines as desired, an operator's switchboard, means for automatically trunking calls extended to certain of said called lines to said switchboard, a visual signal at said switchboard, means thereat operated when the operator answers the call if the called line is of one class for causing the operation of said signal, and means operated if the called line is of a different class for preventing the operation of said signal.

6. In a telephone system, an automatic switch, subscriber controlled means for controlling the operation of said switch to extend connections to called lines of different classes, an operator's switchboard, means for trunking connections extending to called lines of certain classes to said operator's switchboard, a call signal at said switchboard operated when a connection is extended thereto, a cord circuit, and means associated with said cord operated or not operated dependent on the particular class of line called when the operator answers the call to inform such operator of the particular class of the called line.

7. In a telephone system, a calling subscriber's line normally having direct access via automatic switches to other subscribers' lines, means for temporarily plugging any line out of service, an operator's switchboard having a plurality of trunks terminating therein, a trunk hunting switch, a line finder switch, a finder distributer switch, circuit arrangements for causing said finder distributer switch to operate responsive to any calling line extending a connection to a called line out of service, and means in said distributer for controlling said trunk hunting switch to find an idle switchboard trunk and said line finder switch to find the extended calling line and connect it to said idle switchboard trunk.

8. In a telephone system, a calling line, a connector switch, a called line terminating in a line switch, a plug ending tone machine for plugging out said line switch, subscriber controlled means for causing said connector switch to extend said calling line to said called line, an operator's switchboard, means responsive to the attempted extension of said calling line to said called line if the line switch has been plugged out, for trunking said calling line to said switchboard, a plug ending cord circuit including a signal, and means in said cord circuit responsive to said tone machine for controlling the operation of said signal when the operator plugs into said trunked line to inform her of the particular class of the called line.

9. In a telephone system, an automatic switch, subscriber controlled means for controlling the operation of said switch to extend connections to called lines of different classes, a plug ending tone machine for plugging out lines of one class, an operator's switchboard, means responsive to the extension of a calling line to a plugged-out line for trunking said calling line to said operator's switchboard, a call signal at said switchboard operated when a connection is extended thereto, and a cord circuit for testing for the presence of said tone machine and answering said call.

10. In a telephone system, a line having a test contact, a source of signalling current connected to said contact, means including an automatic switch for extending a connection to said line, said switch having a test wiper for engaging said test contact, a jack ending trunk, means including another automatic switch for extending a branch of said connection to said trunk, and a signalling circuit extending from said test contact through all said switches to the sleeve of said jack.

11. In a telephone system, a line having a test contact, a source of signalling current connected to said contact, means including an automatic switch for extending a connection to said line, said switch having a test wiper for engaging said test contact, a trunk line extending to an operator's switch-board, means including another automatic switch for extending a branch of said connection to said trunk, a non-talking conductor extending from said test contact through both said switches to said switch-board and a signalling circuit including said conductor.

12. A telephone system as set forth in claim 11 in which the said second switch includes a relay energized over said conductor for maintaining the connection.

13. In a telephone system, lines to which service is denied and lines to which service is given, both accessible by way of an automatic switch, means for operating the switch to extend a call to either class of lines, means responsive to the calling of a line of the first mentioned class for extending the call to an operator's switchboard, the lines of the first mentioned class consisting of two subclasses of lines, and means for automatically indicating to the operator the particular subclass of the called line.

14. In a telephone system, a line including talking conductors and a test conductor, means for establishing a connection to the line, means for testing the busy or idle condition of the line, means effective if the line is idle for completing the connection, and means effective in the event the line is idle and the last named means fails to operate and directly controlled by said last named means, for extending the call to an operator's switchboard.

15. In a telephone system, a connector switch for extending a connection to a called line, a switching relay in the connector operative to complete a link in the connection if the line is idle, means effective under predetermined idle conditions of the line for preventing the operation of the relay, and means effective in response to the failure of said relay to operate for causing the calling connection to be extended to an operator's switchboard.

16. In a telephone system, a line including a test conductor, means for establishing a connection to the line, a plurality of trunks extending to an operator's switchboard, and time delayed means effective if the test conductor is open to seize any idle trunk in said group of trunks and extend the call thereover.

17. In a telephone system, a line including a test conductor, means for establishing a connection to the line, a plurality of trunks extending to an operator's switchboard, time delayed means for extending the call to any idle trunk in said group of trunks, and means controlled over the test conductor for rendering said last named means ineffective.

18. In a telephone system, a line including a test conductor, means for extending a call to the line, a trunk terminating at an operator's switchboard, means including a finder effective when operated to extend the call over the trunk, time delayed means for starting the finder to operate, and means controlled over the test conductor for rendering the second named means ineffective.

19. In a telephone system, a trunk extending to a connector switch, a branch of the trunk accessible to a finder switch, a starting relay for the finder switch, a test relay and a switching relay in the connector, circuit connections for the starting relay established when the connector has been operated if the test relay and the switching relay are not operated, and means controlled by the starting relay for starting the finder switch to hunt for the branch of the trunk.

20. In a telephone system, a trunk extending to a connector switch, a branch of the trunk accessible to a finder switch, a starting relay for the finder switch, a test relay and a switching relay in the connector, circuit connections for the starting relay established when the connector has been operated if the test relay and the switching relay are not operated, means controlled by the starting relay for starting the finder switch to hunt for the branch of the trunk, and means for extending a connection from said branch by way of the finder switch to an operator's headset.

21. In a telephone system, a trunk, a connector including a testing relay and a switching relay, a plurality of lines accessible to the connector, means for operating the connector over the trunk to select a desired line, a finder switch, a branch of the trunk terminating in the bank of said finder switch, means including a starting relay effective if the test relay and the switching relay both fail to operate for starting the finder to hunt for the branch of the trunk, and means for extending a connection from the branch by way of the finder switch to an operator's headset.

22. In a telephone exchange system, calling lines and various types of called lines, automatic switching mechanism for interconnecting calling and called lines, an operator's position with signals thereat, means for automatically intercepting the connection for the called line and extending it to said operator's position, and means after such connection is extended to operate said signals to indicate the type of the called for line.

23. In a telephone exchange system, calling lines and classified called lines, means for extending connections between said lines, an operator's position with signals thereat, means for automatically extending said lines to said position in lieu of called lines, and means to operate said signals to indicate the classification of the called lines.

24. In a telephone system, calling lines and various types of called lines, means for extending connections between said lines, an operator's position, means for automatically extending a connection to said operator's position instead of a called for line, and means for notifying the operator of the type of the called for line.

25. In a telephone system, calling lines, classified called lines, automatic switching mechanism for extending connections from said calling lines to said called lines, an operator's position, means for automatically intercepting a connection and extending it to said operator's position instead of the called for line, and means for informing the operator of the classification of the called for line.

In witness whereof, I hereunto subscribe my name this 31st day of March, A. D. 1930.

MICHAEL SCHWARTZ.